(12) United States Patent
Lovley, II et al.

(10) Patent No.: US 10,787,221 B2
(45) Date of Patent: Sep. 29, 2020

(54) ELECTRIC SCOOTER

(71) Applicant: BRAVO SPORTS, Santa Fe Springs, CA (US)

(72) Inventors: Jack B. Lovley, II, Lake Forest, CA (US); Joseph C. Klingl, Los Angeles, CA (US); Mark Groenhuyzen, Huntington Beach, CA (US); Kenneth Edlauer, Newbury Park, CA (US)

(73) Assignee: Bravo Sports, Santa Fe Springs, CA (US)

( * ) Notice: Subject to any disclaimer, the term of this patent is extended or adjusted under 35 U.S.C. 154(b) by 0 days.

(21) Appl. No.: 16/257,836

(22) Filed: Jan. 25, 2019

(65) Prior Publication Data

US 2019/0389529 A1     Dec. 26, 2019

Related U.S. Application Data

(63) Continuation of application No. 14/574,125, filed on Dec. 17, 2014, now Pat. No. 10,189,533.
(Continued)

(51) Int. Cl.
*B62K 23/08* (2006.01)
*B62K 11/02* (2006.01)
*B62K 3/00* (2006.01)

(52) U.S. Cl.
CPC .............. *B62K 23/08* (2013.01); *B62K 3/002* (2013.01); *B62K 11/02* (2013.01); *B62K 2204/00* (2013.01)

(58) Field of Classification Search
CPC ........ B62K 23/00; B62K 23/08; B62K 19/00; B62K 19/02; B62K 19/44; B62K 3/002;
(Continued)

(56) References Cited

U.S. PATENT DOCUMENTS

| 2,241,686 A | 5/1941 | Ware |
| 4,124,222 A | 11/1978 | Moe |

(Continued)

FOREIGN PATENT DOCUMENTS

| CN | 2286691 Y | 7/1998 |
| CN | 2376398 Y | 5/2000 |

(Continued)

OTHER PUBLICATIONS

International Search Report and Written Opinion, PCT/US2013/060976 dated Dec. 20, 2013.
(Continued)

*Primary Examiner* — John D Walters
(74) *Attorney, Agent, or Firm* — Knobbe, Martens, Olson & Bear, LLP

(57) ABSTRACT

A scooter having a front wheel and a rear wheel. A steering assembly includes a steering tube and a handlebar. A rear foot brake is configured to apply a braking force to at least one of the front wheel and the rear wheel. A deck is configured to support the weight of a person. A frame is configured to support the deck. The frame comprises a plurality of frame members arranged to form at least two or more vertical planes on one or both lateral sides of the scooter. In some configurations, the rear foot brake is linked to a front brake and configured to actuate the front brake of the front wheel and apply a braking force to the rear wheel simultaneously.

11 Claims, 6 Drawing Sheets

Related U.S. Application Data

(60) Provisional application No. 61/917,892, filed on Dec. 18, 2013.

(58) Field of Classification Search
CPC .. B62K 3/02; B62K 2204/00; B62K 2202/00; B62K 11/02
USPC ....... 280/281.1, 288.2, 87.01, 87.021, 87.03, 280/87.041, 87.05
See application file for complete search history.

(56) References Cited

U.S. PATENT DOCUMENTS

| | | | |
|---|---|---|---|
| 4,168,076 A | 9/1979 | Johnson | |
| 4,315,569 A | 2/1982 | Jaeschke | |
| 4,460,057 A * | 7/1984 | Kohyama | B62K 5/027 |
| | | | 180/210 |
| D291,211 S | 8/1987 | Man | |
| D292,221 S | 10/1987 | Mueller | |
| D295,428 S | 4/1988 | Cummings | |
| 4,761,014 A | 8/1988 | Huang | |
| 4,799,701 A | 1/1989 | Lindau et al. | |
| 4,799,702 A | 1/1989 | Wang | |
| D300,756 S | 4/1989 | Cummings | |
| 4,875,142 A | 10/1989 | Spector | |
| D312,485 S | 11/1990 | Turner | |
| 5,039,121 A | 8/1991 | Holter | |
| 5,214,944 A | 6/1993 | Wolthoff | |
| 5,333,477 A | 8/1994 | Davis | |
| 5,376,869 A | 12/1994 | Konrad | |
| D392,001 S | 3/1998 | Chen | |
| 5,775,452 A | 7/1998 | Patmont | |
| 5,899,474 A | 5/1999 | Grutzik | |
| 5,950,498 A | 9/1999 | Gossett et al. | |
| 6,139,035 A | 10/2000 | Tsai | |
| D433,654 S | 11/2000 | Gorvine | |
| D433,718 S | 11/2000 | McGreen | |
| D437,363 S | 2/2001 | Chen | |
| D441,323 S | 5/2001 | Cheng | |
| 6,250,656 B1 | 6/2001 | Ibarra | |
| D447,188 S | 8/2001 | Lan | |
| 6,273,205 B1 | 8/2001 | Tsai | |
| 6,279,929 B1 | 8/2001 | Fruechtenicht | |
| D448,429 S | 9/2001 | Chen | |
| 6,286,843 B1 | 9/2001 | Lin | |
| D449,860 S | 10/2001 | Lin | |
| 6,298,952 B1 | 10/2001 | Tsai | |
| 6,299,186 B1 | 10/2001 | Kao et al. | |
| D450,355 S | 11/2001 | Chan | |
| 6,315,307 B1 | 11/2001 | Chen | |
| D452,886 S | 1/2002 | Wang et al. | |
| D454,377 S | 3/2002 | Hsu | |
| D454,599 S | 3/2002 | Chen | |
| D456,460 S | 4/2002 | Tseng | |
| D456,461 S | 4/2002 | Koch | |
| D457,574 S | 5/2002 | Chen | |
| 6,382,366 B1 | 5/2002 | Chang | |
| 6,431,302 B2 * | 8/2002 | Patmont | B62M 6/45 |
| | | | 180/228 |
| D464,002 S | 10/2002 | Ho | |
| 6,481,728 B2 | 11/2002 | Chen | |
| D469,348 S | 1/2003 | Demus et al. | |
| D470,409 S | 2/2003 | Clarke et al. | |
| D470,438 S | 2/2003 | Tateishi | |
| 6,555,928 B1 | 4/2003 | Mizuno | |
| D483,078 S | 12/2003 | Jung | |
| D486,532 S | 2/2004 | Christianson | |
| D487,908 S | 3/2004 | Mayer et al. | |
| D489,771 S | 5/2004 | Laver et al. | |
| D492,367 S | 6/2004 | Dennis | |
| 6,752,229 B2 | 6/2004 | Ho | |
| D497,397 S | 10/2004 | Sramek | |
| D505,457 S | 5/2005 | Wong | |
| 6,933,847 B2 | 8/2005 | Feibelman | |
| D516,132 S | 2/2006 | Sramek | |
| 6,997,022 B1 | 2/2006 | DeMange | |
| 7,044,488 B1 | 5/2006 | Hamend | |
| D528,168 S | 9/2006 | Lavarone | |
| 7,100,728 B2 | 9/2006 | Huang et al. | |
| D533,601 S | 12/2006 | Moreira | |
| 7,178,813 B1 | 2/2007 | Bruntmyer | |
| 7,267,352 B2 | 9/2007 | Ishikawa | |
| 7,278,520 B2 | 10/2007 | Kim | |
| D564,037 S | 3/2008 | Cramer et al. | |
| 7,441,914 B2 | 10/2008 | Palmer | |
| D581,991 S | 12/2008 | Armand et al. | |
| 7,597,333 B2 | 10/2009 | Stillinger | |
| 7,819,245 B1 | 10/2010 | Singh et al. | |
| 7,886,901 B1 | 2/2011 | Singh et al. | |
| 7,937,975 B2 | 5/2011 | Kolton et al. | |
| D648,402 S | 11/2011 | Wang | |
| D651,659 S | 1/2012 | Scolari et al. | |
| D654,962 S | 2/2012 | Scolari et al. | |
| D654,965 S | 2/2012 | Herlitz et al. | |
| 8,162,090 B2 | 4/2012 | Atherton et al. | |
| 8,167,074 B1 | 5/2012 | Tsiyoni | |
| D672,400 S | 12/2012 | Pizzi | |
| 8,322,735 B2 | 12/2012 | Steinbach | |
| 8,500,147 B2 | 8/2013 | Johnson | |
| D693,414 S | 11/2013 | Hadley et al. | |
| 8,613,458 B2 | 12/2013 | Ghisolfi et al. | |
| D698,868 S | 2/2014 | Chan | |
| 8,662,508 B2 | 3/2014 | Grossman | |
| 8,696,000 B1 | 4/2014 | Chen | |
| D710,949 S | 8/2014 | Huang | |
| 8,813,892 B2 | 8/2014 | Hadley | |
| D712,980 S | 9/2014 | Lovley, II et al. | |
| D714,396 S | 9/2014 | Talios et al. | |
| 8,864,152 B1 | 10/2014 | Danze | |
| D727,833 S | 4/2015 | Talios et al. | |
| D728,033 S | 4/2015 | O'Connell | |
| 9,045,189 B2 | 6/2015 | Lovley, II et al. | |
| 9,051,017 B2 * | 6/2015 | Scolari | B62K 19/18 |
| D736,324 S | 8/2015 | Lu | |
| D736,861 S | 8/2015 | Eckert et al. | |
| D738,435 S | 9/2015 | O'Connell | |
| 9,168,965 B2 | 10/2015 | Lovley, II et al. | |
| 9,193,332 B2 | 11/2015 | Gillan et al. | |
| D750,180 S | 2/2016 | Edlauer | |
| 9,260,157 B2 | 2/2016 | Chu et al. | |
| 9,272,739 B2 | 3/2016 | Zaid et al. | |
| D755,305 S | 5/2016 | Edlauer et al. | |
| D756,464 S | 5/2016 | Edlauer | |
| D777,261 S | 1/2017 | Desberg | |
| 9,533,734 B2 | 1/2017 | Olsommer et al. | |
| D779,594 S | 2/2017 | Lovley, II et al. | |
| 9,592,876 B2 | 3/2017 | Lovley, II et al. | |
| D795,354 S | 8/2017 | Desberg | |
| D806,176 S | 12/2017 | Peng | |
| 9,994,278 B2 | 6/2018 | Lovley, II et al. | |
| 10,099,745 B2 | 10/2018 | Hadley et al. | |
| 10,124,851 B2 | 11/2018 | Lovley, II et al. | |
| D839,359 S | 1/2019 | Hadley | |
| 10,189,533 B2 | 1/2019 | Lovley, II et al. | |
| 2001/0011202 A1 | 8/2001 | Yamawaki | |
| 2001/0017450 A1 | 8/2001 | Chuang | |
| 2002/0070519 A1 | 6/2002 | Rappaport | |
| 2002/0105157 A1 | 8/2002 | Chen | |
| 2002/0117825 A1 | 8/2002 | Ho | |
| 2002/0170763 A1 * | 11/2002 | Townsend | B60L 15/20 |
| | | | 180/220 |
| 2003/0127822 A1 | 7/2003 | Fleck et al. | |
| 2004/0012166 A1 | 1/2004 | Reginato | |
| 2004/0026144 A1 | 2/2004 | Lan | |
| 2004/0050603 A1 | 3/2004 | Jaeger | |
| 2004/0079571 A1 | 4/2004 | Laver et al. | |
| 2005/0092538 A1 | 5/2005 | Baldwin et al. | |
| 2005/0230930 A1 * | 10/2005 | Chung | A63C 17/012 |
| | | | 280/87.041 |
| 2006/0266570 A1 | 11/2006 | Roth et al. | |
| 2007/0187164 A1 * | 8/2007 | Yang | B62K 13/04 |
| | | | 180/209 |
| 2008/0203691 A1 | 8/2008 | Hsu | |
| 2009/0160150 A1 | 6/2009 | Johnson | |

(56) References Cited

U.S. PATENT DOCUMENTS

| | | |
|---|---|---|
| 2009/0200768 A1 | 8/2009 | Armand et al. |
| 2010/0013183 A1 | 1/2010 | He |
| 2010/0133778 A1 | 6/2010 | Munksoe |
| 2011/0006500 A1 | 1/2011 | Rush |
| 2011/0024217 A1 | 2/2011 | Sluijter et al. |
| 2011/0031711 A1 | 2/2011 | Grossman |
| 2011/0056177 A1 | 3/2011 | Goto |
| 2011/0068554 A1 | 3/2011 | Armand et al. |
| 2011/0200385 A1 | 8/2011 | Broussard |
| 2011/0240391 A1 | 10/2011 | Bonneville |
| 2012/0018967 A1 | 1/2012 | Chen |
| 2012/0048636 A1 | 3/2012 | Huang |
| 2012/0181765 A1 | 7/2012 | Hill |
| 2012/0228845 A1 | 9/2012 | Wegener |
| 2012/0234446 A1 | 9/2012 | Brown |
| 2013/0033883 A1 | 2/2013 | Ward et al. |
| 2013/0256048 A1 | 10/2013 | Chen |
| 2013/0269473 A1 | 10/2013 | Ierfone |
| 2014/0015656 A1 | 1/2014 | Shimizu et al. |
| 2014/0042717 A1 | 2/2014 | Chan |
| 2014/0175768 A1 | 6/2014 | Talavasek et al. |
| 2014/0238758 A1 | 8/2014 | Barth |
| 2015/0166138 A1 | 6/2015 | Lovley, II et al. |
| 2016/0107517 A1 | 4/2016 | Larray et al. |
| 2016/0256767 A1 | 9/2016 | Cerboneschi |
| 2016/0311322 A1 | 10/2016 | Lagant et al. |
| 2016/0347408 A1 | 12/2016 | Guida |
| 2017/0190335 A1 | 7/2017 | Gillett |
| 2017/0369117 A1 | 12/2017 | Lovley, II et al. |
| 2018/0050589 A1 | 2/2018 | Yu et al. |
| 2019/0058982 A1 | 2/2019 | Lee |
| 2019/0135367 A1 | 5/2019 | Lovley, II et al. |
| 2019/0143232 A1 | 5/2019 | Lovley, II et al. |
| 2019/0315426 A1 | 10/2019 | Lovley, II et al. |
| 2020/0047838 A1 | 2/2020 | Lovley, II et al. |
| 2020/0088940 A1 | 3/2020 | Bovington et al. |

FOREIGN PATENT DOCUMENTS

| | | | |
|---|---|---|---|
| CN | 2419148 Y | 2/2001 | |
| CN | 2493513 | 5/2002 | |
| CN | 301291742 S | 7/2010 | |
| CN | 101965289 | 2/2011 | |
| CN | 102050182 | 5/2011 | |
| CN | 202863656 | 4/2013 | |
| CN | 203306176 | 11/2013 | |
| CN | 203473137 U | 3/2014 | |
| CN | 203544249 U | 4/2014 | |
| DE | 4309170 | 9/1994 | |
| EP | 0 570 653 | 11/1996 | |
| EP | 1 982 881 | 10/2008 | |
| EP | 2 127 965 | 12/2009 | |
| EP | 2 762 395 | 8/2014 | |
| FR | 2 555 908 | 6/1985 | |
| GB | 2466241 A | * 6/2010 | ............ B62K 3/002 |
| TW | 461413 | 10/2001 | |
| TW | 481157 | 3/2002 | |
| WO | WO 2004/048168 | 6/2004 | |
| WO | WO 2015/095368 | 6/2015 | |

OTHER PUBLICATIONS

International Search Report and Written Opinion, PCT/US2013/062931, dated Mar. 11, 2014.
International Search Report; Application No. PCT/US2013/062931, dated Oct. 1, 2013.
International Search Report and Written Opinion, PCT/US2014/070917 dated Jun. 9, 2015.
U.S. Appl. No. 14/043,748 (U.S. Pat. No. 9,168,965), filed Oct. 1, 2013, Electric Scooter Assemblies.
U.S. Appl. No. 14/920,835 (U.S. Pat. No. 10,124,851), filed Oct. 22, 2015, Electric Scooter Assemblies.
U.S. Appl. No. 16/186,256, filed Nov. 9, 2018, Electric Scooter Assemblies.
U.S. Appl. No. 14/043,625 (U.S. Pat. No. 9,045,189), filed Oct. 1, 2013, Scooter Assemblies.
U.S. Appl. No. 14/723,892 (U.S. Pat. No. 9,994,278), filed May 28, 2015, Scooter Assemblies.
U.S. Appl. No. 16/002,937, filed Jun. 7, 2018, Scooter Assemblies.
U.S. Appl. No. 16/794,836, filed Feb. 19, 2020, Scooter Assemblies.
U.S. Appl. No. 14/033,108 (U.S. Pat. No. 9,193,332), filed Sep. 20, 2013, Wheel Cover for Wheeled Vehicles.
U.S. Appl. No. 14/948,089, filed Nov. 20, 2015, Wheel Cover for Wheeled Vehicles.
U.S. Appl. No. 29/455,239 (U.S. Pat. No. D712,980), filed May 17, 2013, Scooter Connector Tubing.
U.S. Appl. No. 29/501,638 (U.S. Pat. No. D779594), filed Sep. 5, 2014, Scooter Connector Tubing.
U.S. Appl. No. 14/574,154 (U.S. Pat. No. 9,592,876), filed Dec. 17, 2014, Three-Wheeled Electric Scooter.
U.S. Appl. No. 15/457,469, filed Mar. 13, 2017, Three-Wheeled Electric Scooter.
U.S. Appl. No. 16/357188, filed Mar. 18, 2019, Three-Wheeled Electric Scooter.
U.S. Appl. No. 29/487,964, filed Apr. 14, 2014, Three-Wheeled Scooter.
U.S. Appl. No. 14/574,125 (U.S. Pat. No. 10,189,533), filed Dec. 17, 2014, Electric Scooter.
U.S. Appl. No. 29/477,011 (U.S. Pat. No. D750,180), filed Dec. 18, 2013, Scooter.
U.S. Appl. No. 29/513,250 (U.S. Pat. No. D756,464), filed Dec. 29, 2014, Scooter.
U.S. Appl. No. 29/544,347, filed Nov. 2, 2015, Scooter.
U.S. Appl. No. 29/544,349, filed Nov. 2, 2015, Scooter.
U.S. Appl. No. 29/667,021, filed Oct. 17, 2018, Scooter.
U.S. Appl. No. 29/544,351, filed Nov. 2, 2015, Scooter.
U.S. Appl. No. 29/618,714, filed Sep. 22, 2017, Scooter.
U.S. Appl. No. 29/578,840, filed Sep. 25, 2016, Scooter.
U.S. Appl. No. 29/676,545, filed Jan. 11, 2019, Scooter.
U.S. Appl. No. 16/007,121, filed Jun. 13, 2018, Drag-Reducing Systems and Charging Systems for Electric Scooter.
U.S. Appl. No. 29/622,685, filed Oct. 18, 2017, Adjustable Roller Skate.
U.S. Appl. No. 62/781,544, filed Dec. 18, 2018, Hanging Device for Skateboards and Other Items.

* cited by examiner

ELECTRIC SCOOTER

RELATED APPLICATIONS

This application is a continuation application of U.S. patent application Ser. No. 14/574,125 filed on Dec. 17, 2014, which claims the benefit of U.S. Provisional Patent Application No. 61/917,892, filed Dec. 18, 2013, the entire contents of both of which are incorporated herein by reference.

BACKGROUND

Field

The invention disclosed herein relates generally to scooter assemblies, including electric scooter assemblies.

Description of the Related Art

Many types of scooters exist, including electric scooters having a deck for supporting a user in a standing position and a handlebar for allowing the user to control and steer the scooter. Providing powered movement for a vehicle, such as scooters and other vehicles powered by an electric motor, can also be used to improve the user experience. A need exists for improved electric scooters or at least new designs to provide the consumer with a useful choice.

SUMMARY

In an embodiment, a scooter can generally comprise a front wheel, a rear wheel, a rear foot brake, a deck, a frame, and a steering assembly that includes a handlebar and a steering tube. Preferably, the deck is configured to support the weight of at least a child. In other embodiments, the deck can be configured to support the weight of an adolescent or adult. The front wheel can be coupled to the steering assembly to assist in steering. The rear foot brake can be configured to engage braking of at least one or both of the rear wheel and front wheel.

Preferably, the frame is configured to support at least the deck. In an embodiment, the frame can include multi-planar elements. For example, the frame can include a plurality of frame members that comprise a visible exoskeleton.

The scooter can further include a battery and an electric motor. A throttle cable can be coupled between the handlebar and the electric motor. The throttle cable can be at least partially hidden within an interior of the steering tube.

In some configurations, a scooter comprises a front wheel and a rear wheel. A steering assembly includes a steering tube and a handlebar. A rear foot brake is configured to apply a braking force to at least one of the front wheel and the rear wheel. A deck is configured to support the weight of a person. A frame is configured to support the deck. The frame comprises a plurality of frame members arranged to form at least two or more vertical planes on one lateral side of the scooter.

In some configurations, the scooter further comprises an electric motor, a battery, and a throttle cable coupled to the handlebar and the electric motor. The throttle cable is at least partially hidden within an interior of the steering tube.

In some configurations, the scooter further comprises a transparent chain guard.

In some configurations, the scooter further comprises a speedometer.

In some configurations, the rear foot brake is configured to actuate a front brake of the front wheel and apply the braking force to the rear wheel simultaneously.

In some configurations, the frame comprises a front portion and a rear portion, wherein the front portion defines a pair of vertical planes that diverge in a forward to rearward direction.

In some configurations, the rear portion defines a pair of vertical planes that converge in a forward to rearward direction.

In some configurations, a forward end of the deck is positioned forward of a junction between the front portion and the rear portion of the frame.

In some configurations, at least one plate extends in a lateral direction from one side of the frame to the other side of the frame. The at least one plate is coupled to each side of the frame.

In some configurations, the at least one plate comprises an upper plate on an upper side of the frame and a lower plate on a lower side of the frame.

In some configurations, each portion of the frame that defines a plane comprises a first member, a second member, a third member and a fourth member.

In some configurations, a method of controlling braking of a scooter includes providing a rear foot brake that can be actuated by a user, wherein the rear foot brake applies a braking force to a rear wheel of the scooter. A front brake is provided that applies a braking force to a front wheel of the scooter. The front brake is linked to the rear foot brake such that actuation of the rear foot brake actuates the front brake.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
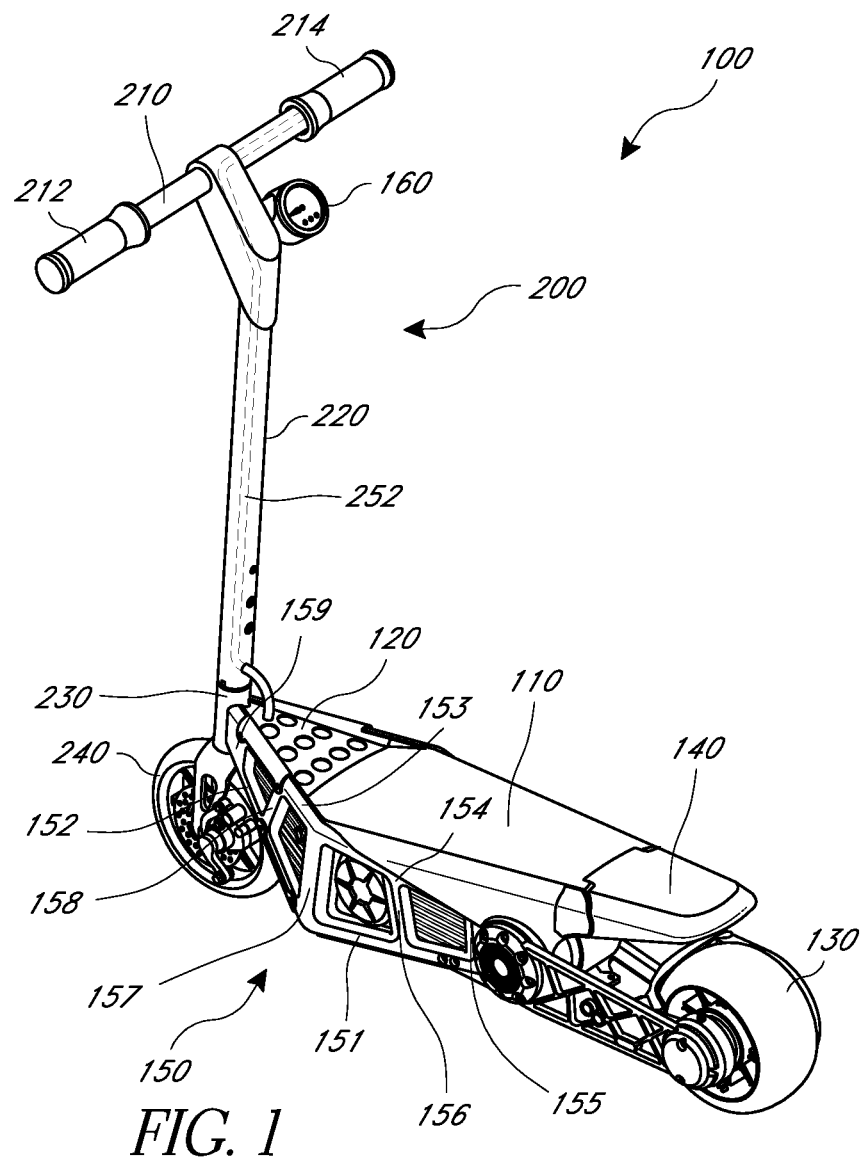
FIG. 1 is a perspective view of an embodiment of a scooter assembly.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIGS. 1-7 illustrate an embodiment of a scooter 100. The scooter 100 can generally comprise a deck 110, a neck portion 120, a rear wheel 130, a foot brake 140, and a steering assembly 200. The deck 110 is a component of the scooter 100 on which a rider can stand during use. For example, the deck 110 can be configured to support the weight of at least a child. In other embodiments, the deck can be configured to support the weight of an adolescent or adult. In some embodiments, the scooter 100 can include an electric motor and a transmission.

The neck portion 120 can be joined to the deck 110 at or near a front end of the deck 110. The neck portion 120 can serve to couple the deck 110 and the steering assembly 200. In some embodiments, the neck portion 120 can be integrally formed with the deck 110.

The steering assembly 200 generally can comprise a handlebar 210, steering tube 220, head tube 230, and a front wheel 240. The steering tube 220 can be supported for rotation relative to and extend through the head tube 230. The deck 110, neck portion 120, and steering assembly 200 can be formed from various materials, including any combination of metals, plastic, carbon fiber, and/or other materials that impart sufficient structural strength to support the weight of a child, adolescent, or adult. At or near a top portion of the steering tube 220, a handlebar 210 can be attached. The handlebar 210 can comprise a left handle 212 and a right handle 214 for the rider to grip and steer the scooter 100. Turning the handlebar 210 can cause the steering tube 220 to turn the front wheel 240.

In some embodiments, the steering assembly 200 also can comprise a display 160, which can be or include a speedometer, mounted to an upper portion of the steering assembly 200. For example, the speedometer 160 can be configured to display a speed of the scooter 100 to a user. The speedometer 160 can include a digital or analog output. In other embodiments, the speedometer 160 can be configured to display additional information to a user. For example, the speedometer 160 could be configured to also display a status of battery charge level to a user. The speedometer 160 can be mounted to an upper portion of the steering assembly 200 with an upward-facing angle so that the speedometer 160 would be approximately facing a user looking down from a normal standing orientation on the scooter 100 for ease of viewing. The speedometer 160 could also be attached to the left handle 212 or the right handle 214.

In addition, the handlebar 210 can comprise a power switch, accelerator or other user control (not shown). In some embodiments, a user can turn on or actuate an electric motor by rotating grips of the left handle 212 and/or right handle 214, such as a rotating grip throttle arrangement. In addition, a user can exercise variable control of a speed output of the electric motor using rotation of the left handle 212 and/or right handle 214. As shown in FIG. 1, a throttle cable 252 can electrically couple electrical components in the handlebar 210 (e.g., the throttle grip) and the electric motor. In some embodiments, a portion or an entirety of the throttle cable 252 can be hidden from view. For example, as indicated in FIG. 1, the throttle cable 252 can be placed within an interior portion of the steering tube 220 so that the throttle cable 252 generally is not externally visible along a substantial entirety of the length of the steering tube 220. In some arrangements, a substantial entirety of the length is seventy-five percent or more of the length. In some embodiments, at least a portion of the throttle cable 252 is located within an interior portion of the steering tube 220. At a lower portion of the steering tube 220, the throttle cable 252 can visibly exit the steering tube 220 and enter the neck portion 120. Alternatively, at a lower portion of the steering tube 220, the throttle cable 252 can transition from the steering tube 220 to the neck portion 120 without being externally visible, such as by passing through an opening in the head tube 230, for example.

The foot brake 140 can be located at or in proximity to a rear portion of the deck 110. In some embodiments, the foot brake 140 can comprise plastic. In other embodiments, the foot brake 140 can comprise metals, carbon fiber, or any other suitable material. The foot brake 140 can be configured to pivot about an axis extending in a lateral direction of the scooter 100. By pivoting downward, the foot brake 140 can provide a direct or indirect braking pressure to the rear wheel 130. The foot brake 140 can be configured to return to its natural un-pivoted position after a user has finished applying braking pressure, such as by a biasing force provided by a biasing arrangement (e.g., a spring). In the illustrated arrangement, the foot brake 140 is a continuous extension of the deck 110. That is, the shape of the deck 110 extends continuously and naturally into the foot brake 140. The upper surface of the deck 110 can have a tapered shape that tapers or reduces in width at a particular rate from forward to rearward ends or front to back. The foot brake 140 can continue from the deck 110 at the same rate of tapering from forward to rearward ends or front to back. Similarly, the foot brake 140 can have side surfaces that continue the shape of the side surfaces of the deck 110, such as the shape of the side surfaces immediately forward of the foot brake 140.

In some embodiments, the foot brake 140 can be configured to engage braking of at least one or both of the rear wheel 130 and front wheel 240. For example, the foot brake 140 can be configured to engage braking of only the rear wheel 130. Alternatively, the foot brake 140 can be configured to engage braking of only the front wheel 240. In other embodiments, the foot brake 140 can be configured to engage simultaneous braking of both the rear wheel 130 and the front wheel 240. For example, the front wheel 240 can include a disc brake, as illustrated, and a linkage can be provided to transfer rotational motion of the foot brake 140 into a suitable motion to actuate the front brake. The front brake can be a mechanical disc brake similar to those used in bicycle applications and sold by Avid or Shimano, for example. Such brakes typically have an actuating arm that can be cable actuated. Thus, the linkage between the foot brake 140 and the front brake can comprise a control cable, such as those typically used in bicycle and motorcycle applications, which often includes a movable inner wire within an outer housing or sheath.

Figure 7:
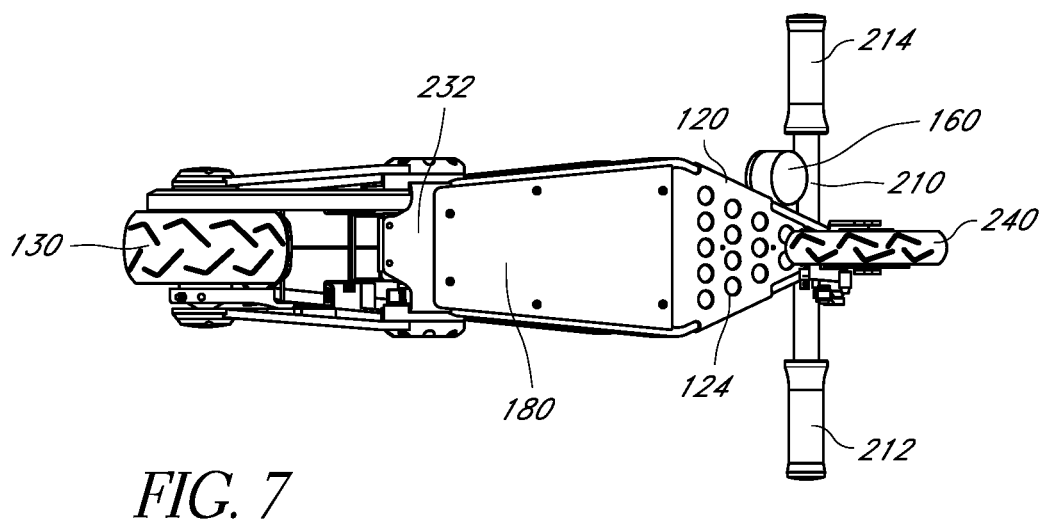
FIG. 7 is a bottom view of the scooter assembly of FIG. 1.

A frame 150 can be configured to provide structural support to at least the deck 110. In addition, the frame 150 can provide a structural foundation for coupling the components of the scooter 100 together, from the neck portion 120 to the rear wheel 130. The frame can have a first half on one lateral side of the scooter 100 and a second half on the other lateral side of the scooter. The first and second halves can be symmetrical and can be coupled at forward and rearward ends by other frame members, such as the head tube 230 and a rear cross member 232 (FIG. 7).

In an embodiment, the frame 150 can include multi-planar elements or portions. For example, the frame 150 can include a plurality of frame members that comprise a visible exoskeleton. The frame 150 can comprise a plurality of substantially planar frame members, including first substantially planar frame members 151, second substantially planar frame members 152, third substantially planar frame members 153, and fourth substantially planar frame members 154. The frame 150 can comprise a plurality of substantially vertical frame members, including first substantially vertical frame members 155, second substantially vertical frame members 156, third substantially vertical frame members 157, fourth substantially vertical frame members 158, and fifth substantially vertical frame members 159. For example, planar frame members as described herein are in contrast to tubular frame members often used in scooter frame construction. Thus, the substantially planar frame members are not necessary completely planar, but simply do not define a completely closed loop as does a tubular frame member. However, in some configurations, the scooter frame can include or be constructed entirely from tubular members.

In some embodiments, the frame 150 is substantially symmetric between a left and right half of the frame 150. So, for example, for one substantially planar frame member 151 on the left half of the frame 150, there is a substantially planar frame member 151 on the right half of the frame 150. Similarly for each of the substantially planar frame members 152, 153, and 154 and substantially vertical frame members 155, 156, 157, 158, and 159 on the left half of the frame 150, there are substantially planar frame members 152, 153, and 154 and substantially vertical frame members 155, 156, 157, 158, and 159, respectively, on the right half of the frame 150.

The frame 150 can comprise a frame portion or element having multi-planar folding to provide additional strength to the structure of the frame 150. That is, in a multi-planar folded arrangement, a single frame member is bent to define portions lying in at least two different planes. Other multi-planar arrangements may not be folded arrangements. In some embodiments, the substantially planar and vertical frame members can combine to form structures that generally can reside in different planes. For example, first substantially planar frame member 151, second substantially vertical frame member 156, fourth substantially planar frame 154, and third substantially vertical frame member 157 can combine to form a first closed loop, which can be a generally rectangular, square or approximately trapezoidal shape that resides in a first plane. In addition, second substantially planar frame member 152, third substantially vertical frame member 157, third substantially planar frame 153, and fourth substantially vertical frame member 158 can combine to form a second closed loop, which can be a generally rectangular, square or approximately trapezoidal shape that resides in a second plane. The first plane of the first approximately trapezoidal shape can be located at an offset angle relative to the second plane of the second approximately trapezoidal shape.

In addition, the plane of the approximately trapezoidal shape formed by the first substantially planar frame member 151, second substantially vertical frame member 156, fourth substantially planar frame 154, and third substantially vertical frame member 157 on the left half of the frame 150 can form a different plane (e.g., a plane that is non-parallel) than the plane of the approximately trapezoidal shape formed by the first substantially planar frame member 151, second substantially vertical frame member 156, fourth substantially planar frame 154, and third substantially vertical frame member 157 on the right half of the frame 150. Similarly, the plane of the approximately trapezoidal shape formed by the second substantially planar frame member 152, third substantially vertical frame member 157, third substantially planar frame 153, and fourth substantially vertical frame member 158 on the left half of the frame 150 can form a different plane (e.g., a plane that is non-parallel) than the plane of the approximately trapezoidal shape formed by the second substantially planar frame member 152, third substantially vertical frame member 157, third substantially planar frame 153, and fourth substantially vertical frame member 158 on the right half of the frame 150. As illustrated, the frame 150 comprises portions defining at least four different planes. In some configurations, the four different planes are arranged in a generally vertical orientation. The planes can be arranged in two forward planes and two rearward planes, with the forward planes being aligned in a length direction (i.e., beginning and ending at approximately the same locations in a length direction) of the scooter 100. Similarly, the rearward planes can be aligned in a length direction. The two forward planes can increase in width in a forward to rearward direction and/or the two rearward planes can decrease in width in a forward to rearward direction. Thus, from a top or bottom view, at least a portion of the frame defined by the multi-planar portions can be in the general shape of a diamond or rhombus. In some configurations, a forward end of the deck 110 can be positioned forward of an intersection or junction between the frame portion defining the forward planes and the frame portion defining the rearward planes.

The multi-planar elements can increase the structural integrity of the frame 150. In some embodiments, the frame 150 can comprise any combination of metals (e.g., aluminum or steel), plastic, carbon fiber, and/or other materials that impart sufficient structural strength to support the weight of a child, adolescent, or adult. However, the increased structural integrity provided by the multi-planar folding can facilitate the usage of materials with less structural strength, such as plastic. In addition, the multi-planar folding of the frame 150 can provide a visible exoskeleton. In some configurations, the frame 150 can include frame elements that define open spaces therebetween such that internal portions or components of the scooter 100 are visible through the external frame. In other words, the frame can surround internal portions or components, but can include openings that expose such internal portions or components. Furthermore, the increased structural strength provided by the multi-planar elements can decrease the weight of the scooter 100, as lighter materials may be used, resulting in increased energy efficiency.

In some embodiments, the scooter 100 can comprise a multi-piece frame construction. The frame 150 can be mechanically assembled from parts as part of a scooter 100 that does not include a suspension. For example, frame 150 can be assembled from parts, including substantially planar frame members 151, 152, 153, and 154 and substantially vertical frame members 155, 156, 157, 158, and 159. In addition, the frame 150 can be mechanically assembled to include additional parts. In other embodiments, certain metal parts of the frame 150 can be welded together.

Figure 2:
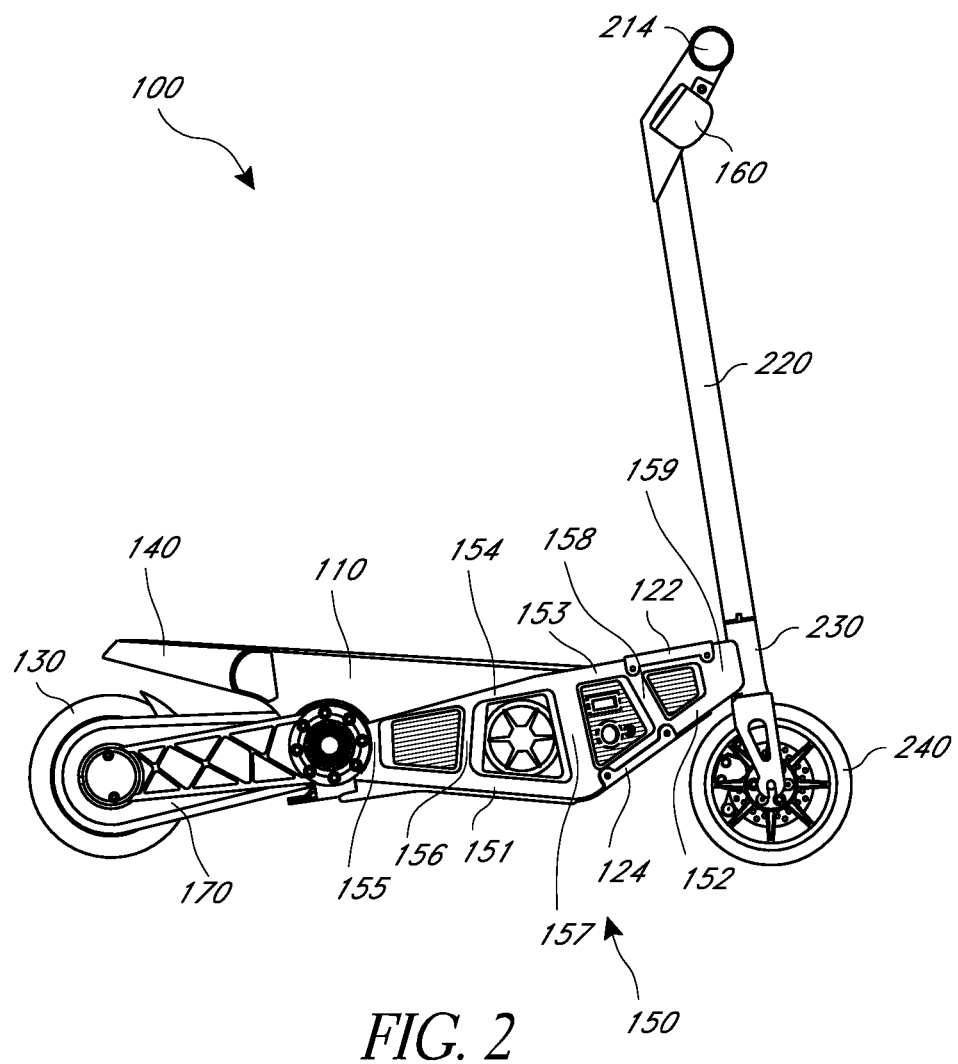
FIG. 2 is a right side view of the scooter assembly of FIG. 1.
Figure 3:
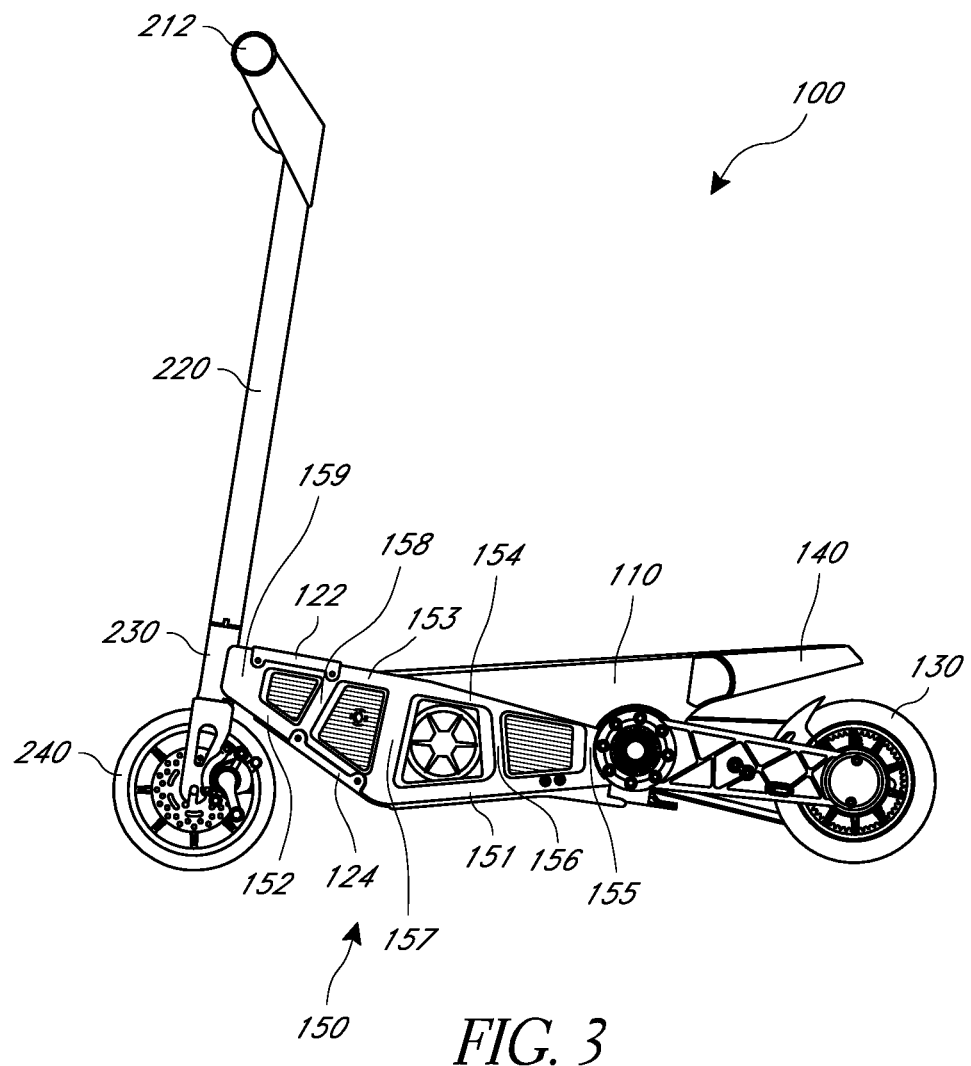
FIG. 3 is a left side view of the scooter assembly of FIG. 1.
Figure 4:
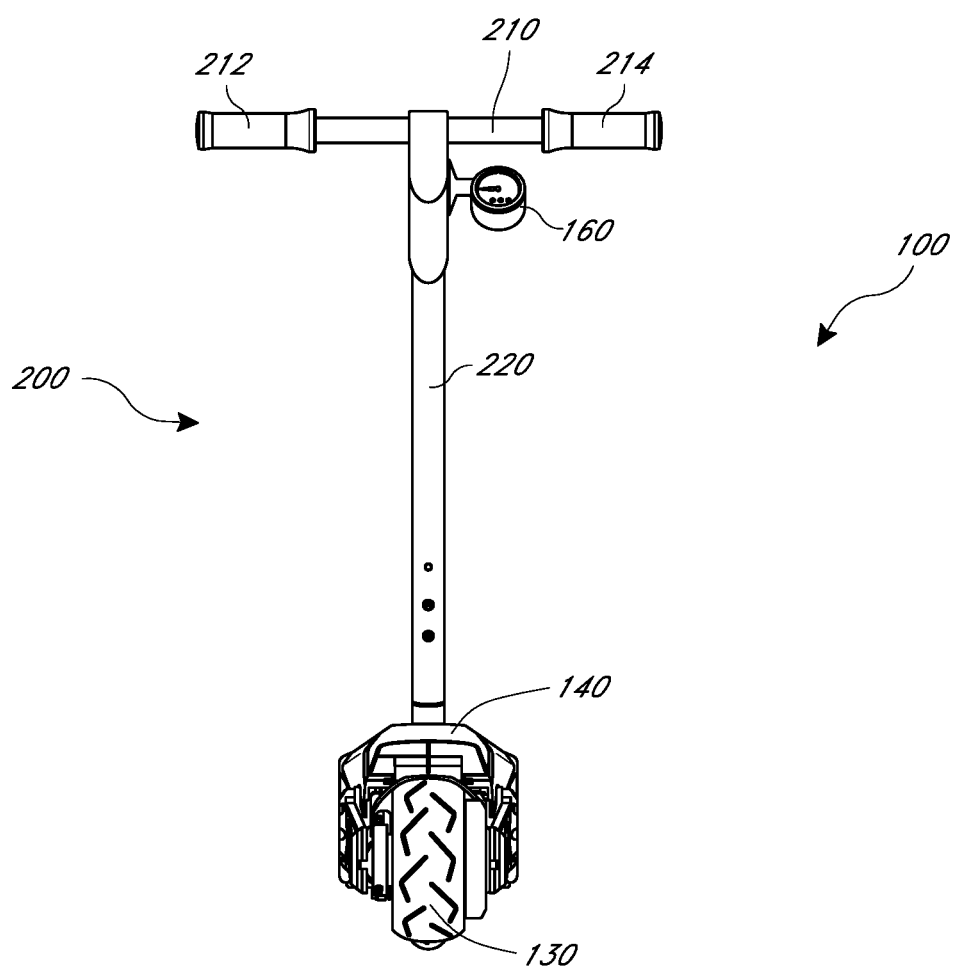
FIG. 4 is a rear view of the scooter assembly of FIG. 1.
Figure 5:
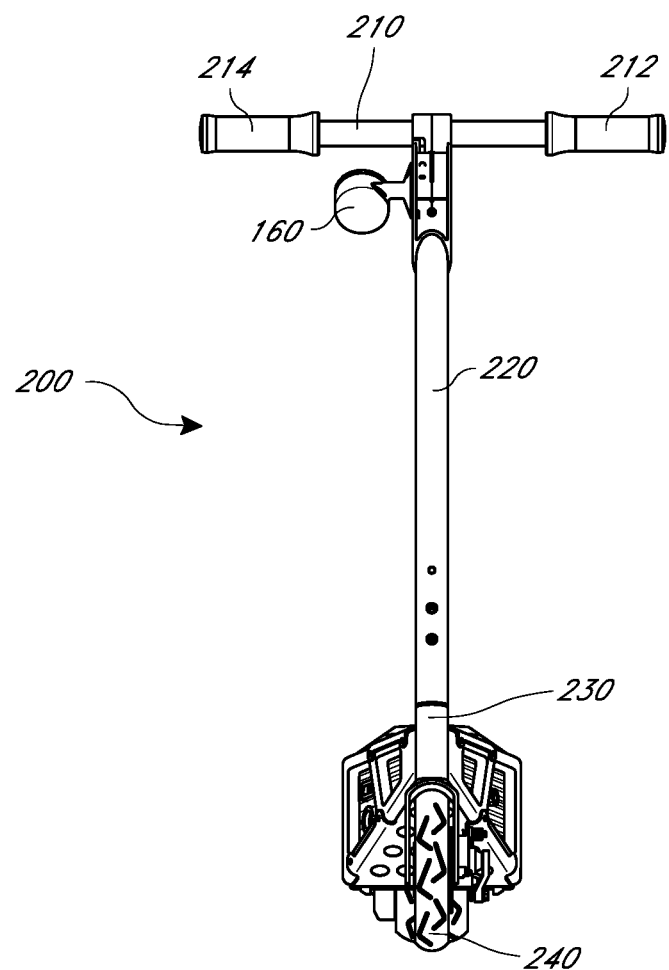
FIG. 5 is a front view of the scooter assembly of FIG. 1.
Figure 6:
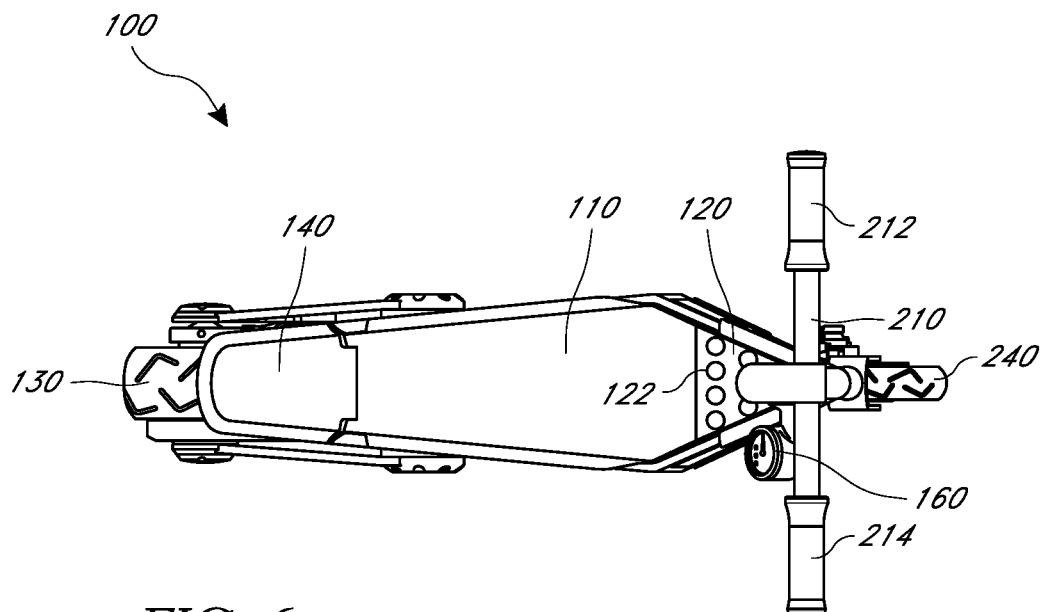
FIG. 6 is a top view of the scooter assembly of FIG. 1.

An electric motor can be configured to provide power output to the rear wheel 130 directly or through a suitable drivetrain arrangement, which can include a suitable transmission and final drive. For example, in some embodiments, a belt or chain can transfer mechanical power from the electric motor (via the transmission) to the rear wheel 130. As shown in FIG. 2, a rearwardly-extending wheel mount portion of the frame can include a chain guard 170 that provides protection against unintended contact with the belt or chain. In preferred embodiments, the chain guard 170 is transparent so that movement of the belt or chain is visible. In other embodiments, the chain guard 170 also can be opaque.

To protect the undersides of the scooter 100 and components, such as the electric motor (not shown), a bash guard 180 can be provided, as shown in FIG. 7. In some embodiments, the bash guard 180 is provided at a location between the rear wheel 130 and the front wheel 240. In preferred embodiments, the bash guard 180 can comprise a metal. In other embodiments, the bash guard 180 can comprise a hard plastic. The bash guard 180 can comprise a curved molded shape or a substantially flat shape. In some embodiments, the bash guard 180 can comprise a plurality of openings. The openings advantageously serve many functions. For example, the openings can allow for weight reduction of the bash guard. Also, the openings can allow airflow to a battery box, and provide a draining mechanism so that the scooter assembly does not retain water in wet conditions.

The neck 120 can include an upper plate member 122 and/or a lower plate member 124. The plate members 122, 124 preferably each extend across in a lateral direction from one half of the frame 150 to the other half of the frame 150 (e.g., between members 153 on each side and/or between members 152 on each side). The plate members 122, 124 can be coupled to each side of the frame 150, such as by fasteners or welding. By being coupled to and extending between each side of the frame 150, the plates 122, 124 add rigidity and resist torsional deflection of the frame 150. The plate member 122 can also function as a portion of the deck 110 or in a manner similar to the deck 110. The plate member 124 can also function as a portion of the bash guard 180 or in a manner similar to the bash guard 180. Thus, the plates 122, 124 can protect internal components or portions of the scooter 100. The plates 122, 124 can comprise a plurality of through holes, which can reduce the weight of the plates 122, 124.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A scooter comprising:
   a front wheel;
   a rear wheel;
   a steering assembly comprising a steering tube and a handlebar;
   a rear foot brake, the rear foot brake configured to apply a braking force to at least one of the front wheel and the rear wheel;
   a deck configured to support the weight of a person; and
   a frame configured to support the deck, the frame comprising a plurality of frame members arranged to form at least two or more vertical planes on one lateral side of the scooter;
   wherein the frame comprises a front portion and a rear portion, wherein the front portion defines a pair of vertical planes that diverge in a forward to rearward direction; and
   wherein the rear portion defines a pair of vertical planes that converge in a forward to rearward direction.

2. The scooter of claim 1, wherein the scooter further comprises:
   an electric motor;
   a battery; and
   a throttle cable coupled to the handlebar and the electric motor, wherein the throttle cable is at least partially hidden within an interior of the steering tube.

3. The scooter of claim 1, wherein the scooter further comprises a transparent chain guard.

4. The scooter of claim 1, wherein the scooter further comprises a speedometer.

5. The scooter of claim 1, wherein the rear foot brake is configured to actuate a front brake of the front wheel and apply the braking force to the rear wheel simultaneously.

6. The scooter of claim 1, wherein a forward end of the deck is positioned forward of a junction between the front portion and the rear portion of the frame.

7. The scooter of claim 1, further comprising at least one plate extending in a lateral direction from one side of the frame to the other side of the frame, the at least one plate being coupled to each side of the frame.

8. The scooter of claim 7, wherein the at least one plate comprises an upper plate on an upper side of the frame and a lower plate on a lower side of the frame.

9. The scooter of claim 1, further comprising at least one plate extending in a lateral direction from one side of the frame to the other side of the frame, the at least one plate being coupled to each side of the frame.

10. The scooter of claim 9, wherein the at least one plate comprises an upper plate on an upper side of the frame and a lower plate on a lower side of the frame.

11. The scooter of claim 1, wherein each portion of the frame that defines a plane comprises a first member, a second member, a third member and a fourth member.

* * * * *